United States Patent
Jason, Jr. et al.

(10) Patent No.: US 7,317,692 B2
(45) Date of Patent: Jan. 8, 2008

(54) NETWORK PATH DISCOVERY

(75) Inventors: James L. Jason, Jr., Hillsboro, OR (US); Erik J. Johnson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1072 days.

(21) Appl. No.: 10/294,353

(22) Filed: Nov. 13, 2002

(65) Prior Publication Data

US 2004/0090922 A1     May 13, 2004

(51) Int. Cl.
*H04L 12/26* (2006.01)
(52) U.S. Cl. ............... 370/252; 370/249; 370/389; 370/400
(58) Field of Classification Search ........ 370/241, 370/242, 248, 249, 252, 389, 400
See application file for complete search history.

(56) References Cited

U.S. PATENT DOCUMENTS

| | | | | |
|---|---|---|---|---|
| 5,892,753 | A * | 4/1999 | Badt et al. ............ | 370/233 |
| 6,337,861 | B1 * | 1/2002 | Rosen ................ | 370/389 |
| 6,512,768 | B1 * | 1/2003 | Thomas .............. | 370/389 |
| 6,747,957 | B1 * | 6/2004 | Pithawala et al. ..... | 370/252 |
| 6,775,706 | B1 * | 8/2004 | Fukumoto et al. ..... | 709/230 |
| 7,154,889 | B1 * | 12/2006 | Rekhter et al. ....... | 370/392 |
| 2003/0188015 | A1 * | 10/2003 | Lee et al. ............ | 709/238 |

OTHER PUBLICATIONS

Mogul et al. "Path MTU Discovery". IETF RFC 1191. Nov. 1990. pp. 1-19.*

* cited by examiner

*Primary Examiner*—Wing Chan
*Assistant Examiner*—Mark A. Mais
(74) *Attorney, Agent, or Firm*—Kacvinsky LLC

(57) ABSTRACT

A method and apparatus to perform network path discovery are described.

15 Claims, 4 Drawing Sheets

NETWORK PATH DISCOVERY

BACKGROUND

A network may comprise a number of network nodes communicating information in accordance with one or more communication protocols. One such protocol is the Internet Protocol (IP). When one IP network node has a large amount of data to send to another IP network node, the data may be transmitted as a series of packets referred to as IP datagrams. It is usually preferable that the datagrams be of the largest size that does not require fragmentation anywhere along the path from the source to the destination. This datagram size is referred to as the Path MTU (PMTU), and it is equal to the minimum of the MTUs of each hop in the path. Conventional techniques for a network node to discover a PMTU for an arbitrary path may be relatively slow. Consequently, there may be need for improvements in such techniques to improve PMTU discovery in a network.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Embodiments of the invention may comprise a method and apparatus to discover a PMTU for a path in a network. In one embodiment of the invention, a cache may be maintained at one or more network nodes in a given path. The cache may include one or more destination addresses and associated PMTU information. The cache may be used to reduce PMTU discovery time.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

Figure 1:
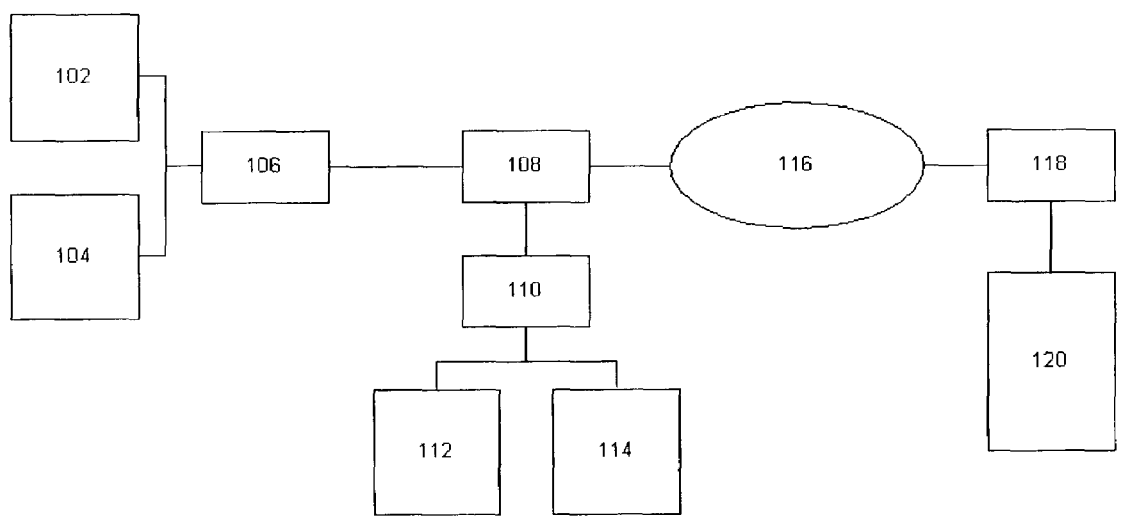
FIG. 1 illustrates a system suitable for practicing one embodiment of the invention.

Referring now in detail to the drawings wherein like parts are designated by like reference numerals throughout, there is illustrated in FIG. 1 a system suitable for practicing one embodiment of the invention. FIG. 1 is a block diagram of a system 100 comprising a number of network nodes connected by one or more communications media. A network node ("node") in this context may include any device capable of communicating information, such as a computer, server, switch, router, bridge, gateway, personal digital assistant, mobile device and so forth. A communications medium may include any medium capable of carrying information signals, such as twisted-pair wire, co-axial cable, fiber optics, radio frequencies, electronic, acoustic or optical signals, and so forth.

More particularly, system 100 may comprise source nodes 102, 104, 112 and 114. System 100 may also comprise intermediate nodes 106, 108, 110 and 118. Node 108 and node 118 may be further connected via a network 116. Network 116 may comprise, for example, additional intermediate nodes. In addition, system 100 may comprise a destination node 120. It can be appreciated that the network nodes shown as part of system 100 are for example only, and that system 100 may comprise a larger or smaller number of network nodes and still fall within the scope of the invention. Furthermore, the terms "connection" and "interconnection," and variations thereof, in this context may refer to physical connections and/or logical connections.

In one embodiment of the invention, system 100 may comprise a packet-forwarding network. Packet forwarding in this context may refer to communicating information over a network in the form of relatively short packets in accordance with one or more communications protocols. A packet in this context may refer to a set of information of a limited length, with the length typically represented in terms of bits or bytes. An example of a packet length might be 1000 bytes. A protocol may comprise a set of instructions by which the information signals are communicated over the communications medium. For example, the protocol might be the Transmission Control Protocol (TCP) as defined by the Internet Engineering Task Force (IETF) standard 7, Request For Comment (RFC) 793, adopted in Sep., 1981 ("TCP Specification"), and the Internet Protocol (IP) as defined by the IETF standard 5, RFC 791, adopted in Sep., 1981 ("IP Specification"), both available from "www.ietf.org" (collectively referred to as the "TCP/IP Specification"). Packets may be addressed using any number of protocols, such as the Internet Protocol Version Four (IPv4) addressing identified by the IP Specification, and the IETF Internet Protocol Version Six (IPv6) draft standard, RFC 2460, dated Dec.1998 ("IPv6 Specification"), also available from "www.ietf.org."

In one embodiment of the invention, the source nodes may comprise nodes that originate a set of information for delivery to destination node 120. Information may comprise any data that may be represented in one or more packets. Examples of information in this context may include data from a voice conversation, videoconference, streaming video, electronic mail ("email") message, voice mail message, alphanumeric symbols, graphics, image, video, text and so forth. An example of information communicated by the source node may be request for a Hypertext Markup Language (HTML) document. Destination node 120 may comprise a node that is the intended recipient of the information. For example, destination node 120 may be a server hosting one or HTML documents. The intermediate nodes may communicate the information between a source node and destination node 120.

In general operation, a source node may send information to destination node 120 through various intermediate nodes in accordance with the IP Specification. The source node breaks a set of information into a series of packets. Each packet may contain a portion of the information plus some control information. The control information may assist intermediate nodes in the network to route each packet to the destination node. A source node may send the packets to an intermediate node. The intermediate node may receive the packets, store them briefly, and pass them to the next intermediate node or destination node 120. Destination node 120 may eventually receive the entire series of packets and may use them to reproduce the original information sent by the source node.

Figure 2:
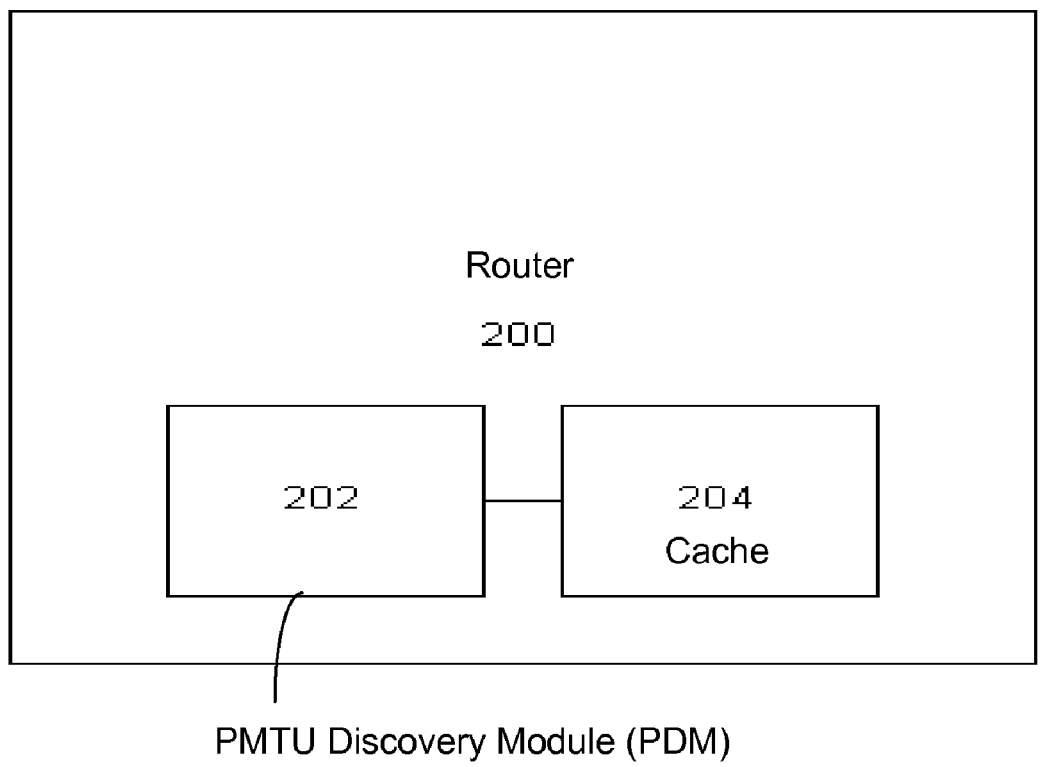
FIG. 2 illustrates a block diagram of a network node in accordance with one embodiment of the invention.

FIG. 2 illustrates a block diagram of a network node in accordance with one embodiment of the invention. FIG. 2 may illustrate a network node 200. Network node 200 may represent, for example, any intermediate node shown in FIG. 1. An example of an intermediate node may be a router. Network node 200 may incorporate functionality that may be implemented as software executed by a processor, hardware circuits or structures, or a combination of both. The processor may be a general-purpose or dedicated processor, such as a processor from the family of processors made by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

In one embodiment of the invention, network node 200 may comprise, for example, a router. Router 200 may route packets of information from a source node to a destination node. Router 200 may further comprise a PMTU Discovery Module (PDM) 202 and a cache 204. PDM 202 may be a software module used to reduce PMTU 20 discovery time using cache 204. Cache 204 may be used to store one or more entries, with each entry having a PMTU associated with a destination address. The operations of PDM 202 and cache 204 may be described more fully below.

Prior to sending information, a source node may attempt to discover the PMTU for the path between the source node and destination node. In one embodiment of the invention, for example, the PMTU may be discovered using a discovery algorithm as set forth in IETF RFC 1191, dated Nov. 1990 ("PMTU Discovery Specification"). The PMTU Discovery Specification describes a technique for using the Don't Fragment (DF) bit in the IP header to dynamically discover the PMTU of a path. The basic idea is that a source node initially assumes that the PMTU of a path is the known MTU of its first hop, and sends all datagrams on that path with the DF bit set. If any of the datagrams are too large to be forwarded without fragmentation by some router along the path, that router will discard them and return ICMP Destination Unreachable messages with a code meaning "fragmentation needed and DF set" and the MTU of the constricting hop ("Datagram Too Big Message"). Upon receipt of such a message, the source host reduces its assumed PMTU for the path using the returned MTU, and iteratively repeats the process. The PMTU discovery process may end when the datagrams can be delivered without fragmentation, as indicated when the source node no longer receives the Datagram Too Big Messages.

A potential deficiency of this discovery algorithm is that the iterative process would be used for all source nodes, even if the resulting PMTU would be the same as another source node. Using FIG. 1 as an example, assume that source node 102 had previously iteratively determined the PMTU to server 120. If source node 104 wanted to communicate information to server 120, it would also use the same iterative algorithm set forth in the PMTU Discovery Specification, despite the fact that the PMTU for source node 104 may be the same as source node 102.

One embodiment of the invention attempts to solve this problem by configuring network nodes along the path using a PDM. The PDM may maintain a cache for a network node, such as a router. Each cache would map a destination to the PMTU of the path from the router to the destination. If the router receives from a source node an IP datagram with the DF bit set in the IP header, it would consult the cache to determine whether a PMTU is associated with the destination address in the IP datagram. If the PMTU is found, a message may be sent from the router to the source node with the PMTU. In this manner, the time needed to discover the PMTU may be reduced.

In one embodiment of the invention, the PDM may build and maintain the cache by observing the Datagram Too Big Messages. If the PDM detects such a message, it may retrieve the associated destination address and MTU of the constricting hop. Both may be stored as an entry in the cache. Whenever a message is received with the same destination address and a lower MTU, the lower MTU may be used to replace the previous MTU. The MTU associated with the destination address may be used as the PMTU, and returned to a source node when appropriate. Since router memory is limited, the cache may need to have a scheme to handle new entries once the memory allocated to the cache is full. The PDM may use a number of different schemes to replace entries once the cache is full, such as replacing those entries used the least or oldest in time, although the embodiments are not limited in this context. It may be appreciated that cache entries may eventually time out after a certain period of time for routine cache maintenance and since Internet routes may periodically change.

Figure 3:
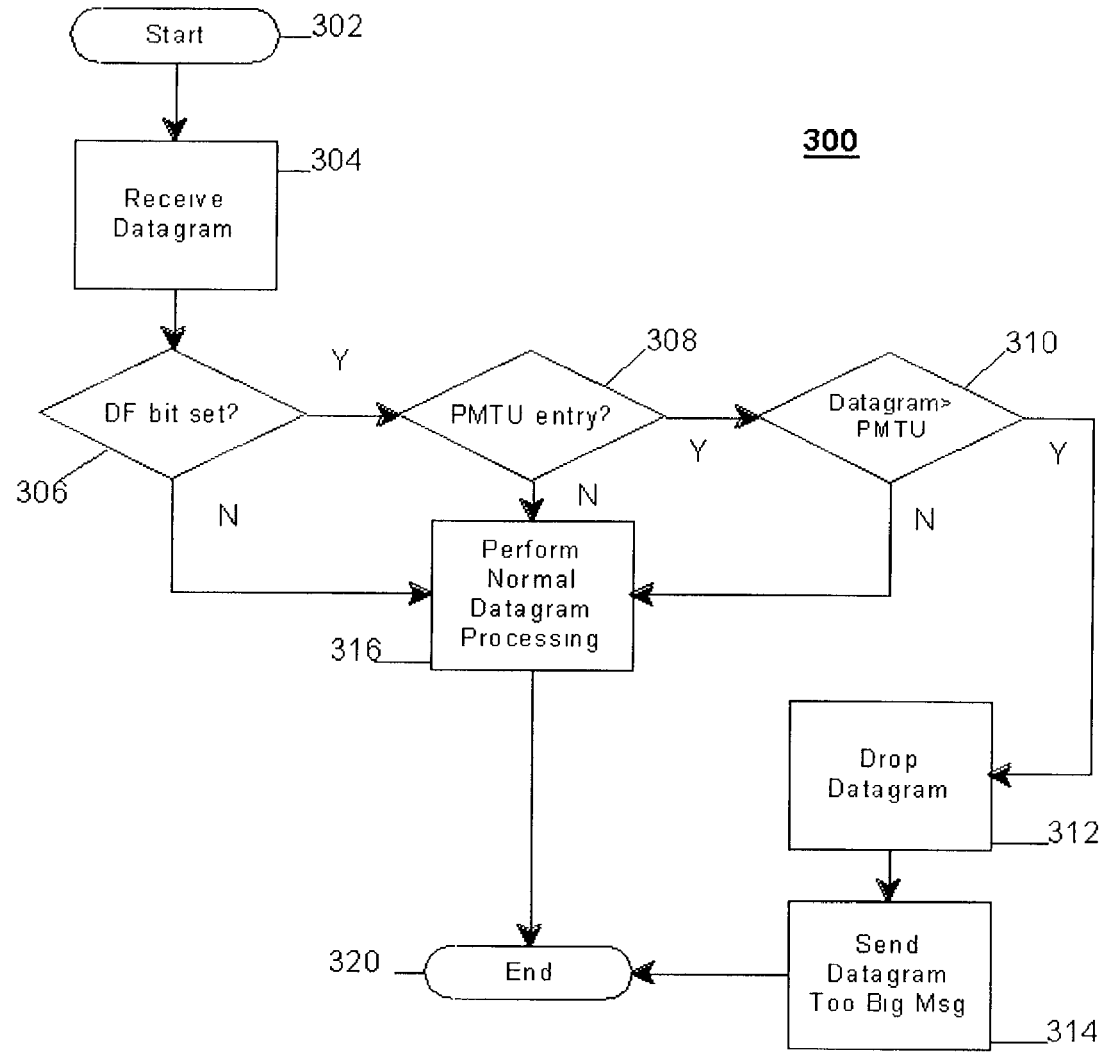
FIG. 3 is a first block flow diagram of the programming logic performed by a Path Maximum Transmission Unit (PMTU) Discovery Module (PDM) in accordance with one embodiment of the invention.
Figure 4:
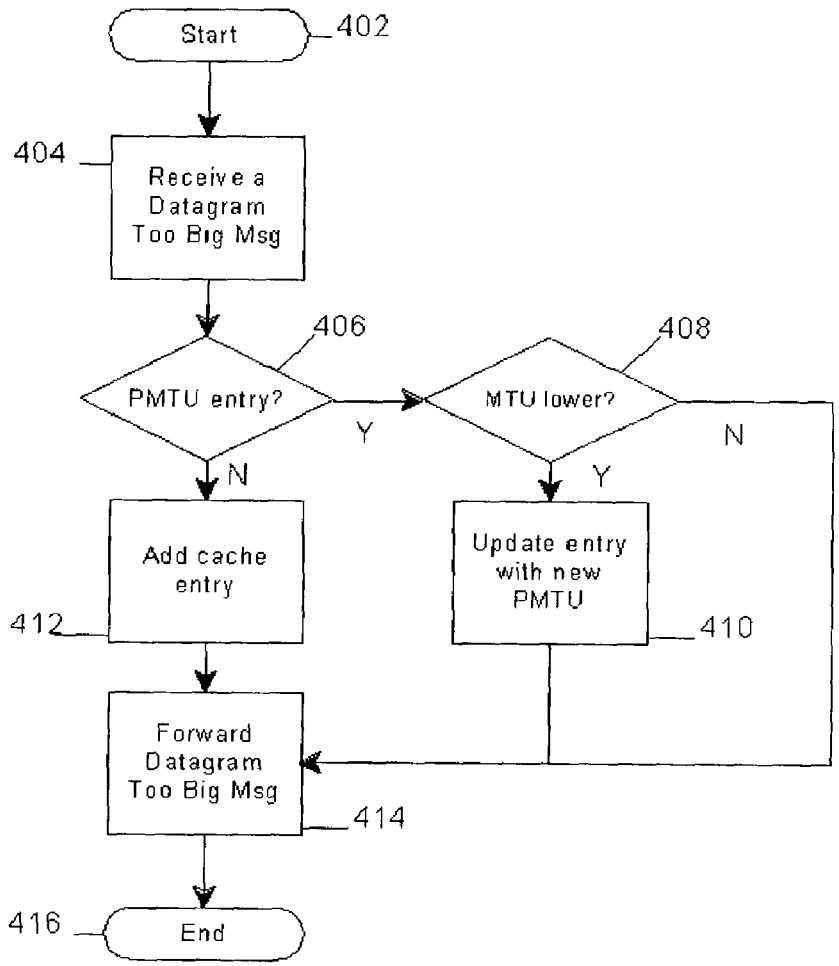
FIG. 4 is a second block flow diagram of the programming logic performed by a PDM in accordance with one embodiment of the invention.

The operations of systems 100 and 200 may be further described with reference to FIGS. 3 and 4 and accompanying examples. Although FIGS. 3 and 4 presented herein may include a particular processing logic, it can be appreciated that the processing logic merely provides an example of how the general functionality described herein can be implemented. Further, each operation within a given processing logic does not necessarily have to be executed in the order presented unless otherwise indicated.

FIGS. 3 and 4 are block flow diagrams of the operations performed by a PDM in accordance with embodiments of the invention. In one embodiment of the invention, these modules may refer to the software and/or hardware used to implement the functionality for one or more embodiments as described herein. In this embodiment of the invention, these modules may be implemented as part of an intermediate node, such lo as intermediate node 200. It can be appreciated that this functionality, however, may be implemented by any device, or combination of devices, located anywhere in a communication network and still fall within the scope of the invention.

FIG. 3 illustrates a programming logic 300 for a PDM in accordance with one embodiment of the invention. Programming logic 300 begins at block 302. An IP datagram may be received at block 304. The IP datagram may originate, for example, from a source node. A determination may be made as to whether a DF bit is set at block 306. If the DF bit is not set at block 306, the IP datagram may be processed as normal at block 316, and operations may end at block 320. If the DF bit is set at block 306, then a determination may be made as to whether a PMTU entry exists for the destination address at block 308. If there is no PMTU entry for the destination address at block 308, the IP datagram may be processed as normal at block 316, and operations may end at block 320. If there is a PMTU entry for the destination address at block 308, a determination may be made as to whether the IP datagram is larger than the PMTU at block 310. If the IP datagram is not larger than the PMTU at block 310, then the IP datagram may be processed as normal at block 316, and operations may end at block 320. If the IP datagram is larger than the PMTU at block 310, then the IP datagram may be dropped at block 312. A Datagram Too Big Message with the retrieved PMTU may be sent to the source node at block 314, and operations may end at block 320.

FIG. 4 is a second block flow diagram of the programming logic performed by a PDM in accordance with one embodiment of the invention. FIG. 4 illustrates a programming logic 400. Programming logic 400 may begin at block 402. A Datagram Too Big Message may be received at block 404. A determination may be made as to lo whether a PMTU entry exists for the destination address at block 406. If a PMTU entry does not exist at block 406, a new cache entry may be made at block 412. The Datagram Too Big Message may be forwarded out the appropriate interface at block 414, and operations may end at block 416. If a PMTU entry does exist at block 406, a determination may be made as to whether the new PMTU associated with the Datagram Too Big Message is lower than the PMTU associated with the destination address in the cache entry. If the new PMTU is not lower than the stored PMTU, then the Datagram Too Big Message may be forwarded at block 414, and operations may end at block 416. If the new PMTU is lower than the stored PMTU, then the entry is updated with the new PMTU at block 410, and control is passed to block 414.

The operation of systems 100 and 200, and the processing logic shown in FIGS. 3 and 4, may be better understood by way of example. Referring again to FIG. 1, assume that the PMTU to server 120 has yet to be discovered. If source node 102 discovers the PMTU to server 120, then intermediate nodes 106, 108 and 118, as well as any intermediate nodes that are part of network 116, may cache for some predetermined amount of time the PMTU from itself to server 120. When source node 104 attempts to discover the PMTU to server 120, intermediate node 106 may respond with the appropriate PMTU. When source node 112 attempts to discover the PMTU, intermediate node 110 may not have the appropriate cache entry. Intermediate node 108, however, may still have the appropriate entry in its cache and may return the PMTU to source node 112. If not, then the PMTU discovery process may continue until an intermediate node in the path does have the appropriate cache entry. A worst case scenario may degenerate to the existing PMTU discovery algorithm.

When routes are symmetric, the embodiments may act as a hierarchical method of supplying PMTU information. The term symmetric may refer to when datagrams from server 120 to source node 102 takes the reverse path as datagrams from source node 102 to server 120. Symmetric PMTU operation, for example, may allow server 120 to use the PMTU discovered by source node 102 when it communicates with source node 102. In an Open Shortest Path First (OSPF) Autonomous System (AS), the majority of routes are symmetric. In the core of the Internet, approximately half of the routes may be symmetric. Of the asymmetric routes, two-thirds differ in two hops or less. Therefore, even in the face of asymmetric routes, the embodiments may provide a more efficient technique of discovering PMTU as these asymmetric routes may still have a majority of tile hops in common.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to discover a path maximum transmission unit (MTU), comprising:
   receiving at an intermediate node from a network node a packet having an indicator to not fragment said packet and a destination address;
   searching at said intermediate node for a path maximum transmission unit (PMTU) corresponding to said destination address; and
   communicating said PMTU from said intermediate node to said network node in accordance with said search.

2. The method of claim 1, further comprising:
   retrieving a packet size for said packet;
   determining whether said packet size is larger than said PMTU; and
   communicating a message to said network node indicating said destination is unreachable with said indicator if said packet size is larger than said PMTU.

3. The method of claim 2, further comprising dropping said packet if said packet size is larger than said PMTU.

4. The method of claim 1, wherein said packet is a packet as set forth in an Internet Protocol (IP) Specification.

5. The method of claim 1, wherein said indicator is a do not fragment bit as set forth in said IP Specification.

6. The method of claim 1, wherein said message is communicated in accordance with an Internet Control Message Protocol (ICMP) Specification.

7. The method of claim 1, further comprising performing PMTU discovery if said PMTU is not found during said search.

8. An article comprising:
   a storage medium;
   said storage medium including stored instructions that, when executed by a processor, result in discovering a path maximum transmission unit (MTU) by receiving at an intermediate node from a network node a packet having an indicator to not fragment said packet and a destination address, searching at said intermediate node for a path maximum transmission unit (PMTU) corresponding to said destination address, and communicating said PMTU from said intermediate node to said network node in accordance with said search.

9. The article of claim 8, wherein the stored instructions, when executed by a processor, further result in retrieving a packet size for said packet, determining whether said packet size is larger than said PMTU, and communicating a message to said network node indicating said destination is unreachable with said indicator if said packet size is larger than said PMTU.

10. The article of claim 8, wherein the stored instructions, when executed by a processor, further result in dropping said packet if said packet size is larger than said PMTU.

11. The article of claim 8, wherein the stored instructions, when executed by a processor, further result in performing PMTU discovery if said PMTU is not found during said search.

12. A system, comprising:
a computing platform adapted to discovering a PMTU;
said platform being further adapted to receiving at an intermediate node from a network node a packet having an indicator to not fragment said packet and a destination address, searching at said intermediate node for a path maximum transmission unit (PMTU) corresponding to said destination address, and communicating said PMTU from said intermediate node to said network node in accordance with said search.

13. The system of claim 12, wherein said platform is further adapted to retrieving a packet size for said packet, determining whether said packet size is larger than said PMTU, and communicating a message to said network node indicating said destination is unreachable with said indicator if said packet size is larger than said PMTU.

14. The system of claim 12, wherein said platform is further adapted to dropping said packet if said packet size is larger than said PMTU.

15. The system of claim 12, wherein said platform is farther adapted to performing PMTU discovery if said PMTU is not found during said search.

* * * * *